United States Patent
Ross et al.

(10) Patent No.: US 7,129,506 B2
(45) Date of Patent: Oct. 31, 2006

(54) OPTICALLY DETECTABLE SECURITY FEATURE

(75) Inventors: Gary A. Ross, Fife (GB); Patricia Pollard, Aberdeen (GB); Catherine Hunter, Aberdeen (GB); Simon Officer, Aberdeen (GB); Gopala Radhakrishna Prabhu, Aberdeen (GB)

(73) Assignee: NCR Corporation, Dayton, OH (US)

( * ) Notice: Subject to any disclaimer, the term of this patent is extended or adjusted under 35 U.S.C. 154(b) by 110 days.

(21) Appl. No.: 10/822,582

(22) Filed: Apr. 12, 2004

(65) Prior Publication Data

US 2004/0262547 A1    Dec. 30, 2004

(51) Int. Cl.
  *G06K 5/00*     (2006.01)
  *G01N 21/64*    (2006.01)

(52) U.S. Cl. ............ 250/556; 250/483.1; 250/492.1; 356/71; 252/301.34; 252/301.35; 252/301.36; 252/301.4 R; 252/301.4 F; 428/195.1; 428/690; 283/74; 283/87; 283/92; 194/207

(58) Field of Classification Search ............ 250/556, 250/492.1, 492.22, 483.1, 484.4, 486.1; 356/71; 106/31.15, 31.64, 31.3, 31.32; 252/301.16, 301.34–301.36, 301.4 R, 301.4 F; 283/72–74, 92, 94–96, 117, 901; 428/195.1, 428/690; 209/534; 194/206, 207, 211–214, 194/328, 330, 353

See application file for complete search history.

(56) References Cited

U.S. PATENT DOCUMENTS

| | | | |
|---|---|---|---|
| 3,412,245 A | 11/1968 | Halverson | |
| 3,473,027 A | 10/1969 | Freeman et al. | |
| 3,582,623 A | 6/1971 | Rothery et al. | |
| 3,650,400 A | 3/1972 | Warren et al. | |
| 3,666,946 A | 5/1972 | Trimble | |
| 4,047,033 A | 9/1977 | Malmberg et al. | |
| 4,451,521 A * | 5/1984 | Kaule et al. ................ | 428/199 |
| 4,736,425 A | 4/1988 | Jalon | |
| 5,786,219 A * | 7/1998 | Zhang et al. ............... | 436/523 |
| 5,837,042 A | 11/1998 | Lent et al. | |
| 6,165,592 A * | 12/2000 | Berger et al. ............ | 428/195.1 |
| 6,211,526 B1 * | 4/2001 | Huston et al. ........... | 250/484.4 |
| 6,344,261 B1 | 2/2002 | Kaule et al. | |
| 6,506,476 B1 | 1/2003 | Kaule et al. | |
| 6,576,155 B1 * | 6/2003 | Barbera-Guillem .... | 252/301.36 |
| 6,613,137 B1 | 9/2003 | Egger et al. | |
| 6,966,998 B1 * | 11/2005 | Spowart ..................... | 252/582 |
| 2004/0031931 A1 | 2/2004 | Muller et al. | |
| 2004/0171076 A1 * | 9/2004 | Dejneka et al. .............. | 435/7.1 |
| 2004/0227112 A1 | 11/2004 | Howard | |

(Continued)

FOREIGN PATENT DOCUMENTS

EP     0 700 980 A1    3/1996

(Continued)

OTHER PUBLICATIONS

Cole-Parmer Technical Library "Physical Properties of Glass", http://www.coleparmer.com/technifo/techinfo.asp?openlist=D,D6&htmlfile=Properties_Glass.htm&Title=Properties+of+Glassware.*

(Continued)

*Primary Examiner*—Stephone B. Allen
*Assistant Examiner*—Suezu Ellis

(57) ABSTRACT

An optically detectable security marker for emitting light at a pre-selected wavelength. The marker comprises a rare earth dopant and a carrier incorporating the rare earth dopant. The interaction of the carrier and the dopant is such that the fluorescent fingerprint of the marker is different from that of the rare earth dopant. The marker may be incorporated into a plurality of items, such as fluids, for example paint, fuel or ink, and laminar products such as paper or banknotes or credit cards.

11 Claims, 3 Drawing Sheets

EXAMPLE OF AN ARRANGEMENT FOR
IN-SITU VALIDATION OF SECURITY LABEL

U.S. PATENT DOCUMENTS

2005/0178841 A1* 8/2005 Jones et al. .................. 235/468

FOREIGN PATENT DOCUMENTS

| EP | 1 116 755 A1 | 7/2001 |
| EP | 1 117 060 A | 7/2001 |
| EP | 1 117 060 A1 | 7/2001 |
| FR | 2 556 867 A | 6/1985 |
| GB | 2 258 659 A | 2/1993 |
| WO | WO 97/10307 | 3/1997 |
| WO | WO 00/27645 A | 5/2000 |
| WO | WO 03/105075 A | 12/2003 |

OTHER PUBLICATIONS

Dejnka et al., "Rare Earth Doped Glass Microbarcodes", Jan. 21, 2003, PNAS, vol. 100, No. 2, 389-393.*

"Novel online security system based on rare-earth-doped glas microbeads", S. Officer et al., Proceedings of the SPIE—The International Society for Optical Engineering SPIE-Int. Soc. Opt. Eng USA, vol. 5310, No. 1, Jan. 20, 2004, pp. 387-395, XP002323046.

"Rare earth-doped glass microbarcodes", Matthew J. Dejneka et al., Science and Technology Division, Corning Incorporated, Corning, NY 14831, PNAS, Jan. 21, 2003, vol. 100, No. 2, pp. 389-393, www.pnas.org/cgi/doi/10.1073/pnas.0236044100.

Patent Abstracts of Japan, vol. 2000, No. 24, May 11, 2001 & JP 2001206959 A (Toppan Printing Co Ltd), Jul. 31, 2001.

* cited by examiner

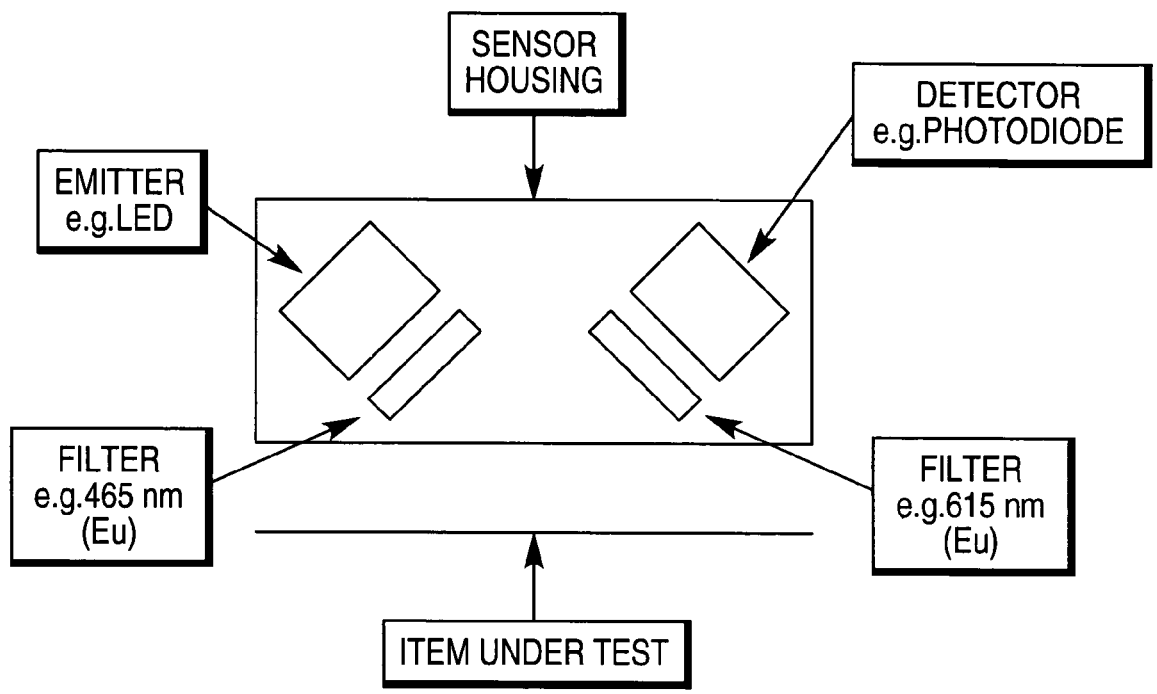
FIG. 1 : EXAMPLE OF AN ARRANGEMENT FOR IN-SITU VALIDATION OF SECURITY LABEL

FIG. 2: EUROPIUM IN BOROSILICATE BASED GLASS

| EXCITATION WAVELENGTH (nm) | EMISSION WAVELENGTH (nm) | FLUORESCENT INTENSITY |
|---|---|---|
| 395 | 535 | 14.433 |
| 395 | 590.5 | 82.873 |
| 395 | 615 | 285.211 |
| 395 | 654 | 13.332 |
| 415 | 590.5 | 11.469 |
| 415 | 615 | 30.916 |
| 465 | 615 | 175.781 |
| 465 | 590.5 | 38.013 |
| 535 | 615 | 28.495 |

FIG. 3: EUROPIUM IN AQUEOUS SOLUTION

| EXCITATION WAVELENGTH (nm) | EMISSION WAVELENGTH (nm) | FLUORESCENT INTENSITY |
|---|---|---|
| 395 | 526 | 1.746 |
| 395 | 536 | 2.495 |
| 395 | 556.5 | 8.633 |
| 395 | 592.5 | 85.608 |
| 395 | 618.5 | 30.277 |
| 415 | - | - |
| 465 | 594 | 2.288 |
| 465 | 616.5 | 0.793 |
| 465 | 700.5 | 3.915 |
| 535 | 592 | 1.126 |

OPTICALLY DETECTABLE SECURITY FEATURE

BACKGROUND OF THE INVENTION

The present invention relates to a security marker, and to an item incorporating a security marker. The invention also relates to a system for detecting a security marker.

Security markers are provided to enable an item to be validated. The need for security markers for valuable items, such as documents, is well known. Banknotes typically include advanced security features, such as watermarks, fluorescent inks, security threads, holograms, kinegrams, and such like. However, with advances in copying technology, it is becoming more difficult to provide security features, which are difficult to counterfeit, easy to detect, quick to detect in situ, and not too expensive to incorporate in an item.

Chemical and biochemical taggants (also known as labels, markers, or tags) are added to items as markers that can be detected to validate the items. However, to validate such taggants, the taggants typically have to be removed from the item and then analyzed. This is both time-consuming and expensive, which renders such taggants inappropriate for on-line, high speed examination.

Optical based techniques have been used for non-visual encoding of a range of products. One of the most widely employed optical labeling strategies uses fluorescent labels, for example labels printed using fluorescent ink or dye. Fluorescent materials emit light when excited by radiation of a particular wavelength. Information can be encoded by forming marks using fluorescent inks, which information can only be retrieved when the mark is illuminated with radiation of the appropriate wavelength. An example of a particular type of fluorescent ink is described in U.S. Pat. No. 5,256,193. JP 8208976; U.S. Pat. No. 4,736,425; U.S. Pat. No. 5,837,042; U.S. Pat. No. 3,473,027; U.S. Pat. No. 5,599,578; GB 2,258,659; U.S. Pat. No. 6,344,261; and U.S. Pat. No. 4,047,033 describe various security labeling and printing applications. However, known inks and dyes have the disadvantage that they have very broad spectra, which limits the number of inks and dyes that can be used in an item.

SUMMARY OF THE INVENTION

It is among the objects of an embodiment of the present invention to obviate or mitigate one or more of the above disadvantages or other disadvantages of the prior art.

According to a first aspect of the present invention there is provided an optically detectable security marker for emitting light at a pre-selected wavelength, the marker comprising: a rare earth dopant and a carrier incorporating the rare earth dopant, the interaction of the carrier and the dopant being such as to provide a fluorescent fingerprint or response that is different from that of the rare earth dopant.

The rare earth element has an intrinsic set of electronic energy levels. The interaction between the carrier and the dopant is such that these intrinsic energy levels change when the dopant is incorporated into the carrier. For example, when the dopant is incorporated into a glass, new bonds are formed in the doped glass, thus altering the electron arrangement and hence the energy levels of absorption and fluorescent emission. Altering the rare earth dopant and/or dopant chelate and/or the composition of the carrier changes these energy levels and hence the observed fluorescent fingerprint.

By virtue of this aspect of the invention an optically detectable security marker is provided that can be tailored to have strong fluorescent light emission at a pre-selected wavelength when illuminated with a particular wavelength of light. This enables a validator to validate the security marker by detecting emission at the pre-selected wavelength in response to radiation at a particular wavelength. Such a security marker is very difficult to replicate by a counterfeiter.

Preferably, the rare earth dopant is a lanthanide.

Preferably, the carrier comprises a glass or a plastic. The carrier in which the rare earth dopant is embedded can readily be produced in a variety of formats, e.g. microbeads or fibers suitable for inclusion in plastic or paper products. Alternatively they may be an integral part of the polymer matrix forming a product.

Due to the very discrete fluorescence wavelength of a carrier doped with a rare earth element, multiple carriers can be used (or a single carrier doped with multiple rare earth elements), each prepared to have a different pre-selected emission wavelength, so that a security profile comprising multiple wavelengths can be provided in a single item without the different wavelengths overlapping each other. This enables a security marker to be provided that has a security profile selected from a large number of permutations, thereby greatly increasing the difficulty in counterfeiting such a security marker.

The carrier doped with the rare earth ion has a new energy level profile that allows transitions different to those allowed by either the rare earth element or the undoped carrier.

The new energy profile is particularly advantageous for security purposes because it provides narrow emissions at wavelengths not naturally found in either the rare earth element or the undoped carrier. These narrow emissions can be used as part of a security marker.

Preferably a plurality of rare earth dopants is used. One or more of these different rare earth dopants may have intrinsic fluorescence emissions that are visible to the unaided human eye and one or more may have intrinsic fluorescence emissions that are invisible to the unaided human eye, for example infra-red or ultra-violet fluorescence emissions.

Preferably, the combined effect of the carrier and the rare earth dopant is such as to cause the security marker to emit light that is visible by the unaided eye, for example in the range of 390–700 nm.

Preferably, the security marker can be excited by highly selective, high intensity visible light and the resultant emission can be detected in the visible region.

According to a second aspect of the present invention there is provided an item having an optically detectable security feature for emitting light at a pre-selected wavelength, the item comprising: a rare earth dopant and a carrier incorporating the rare earth dopant, the interaction of the carrier and the dopant being such as to provide a fluorescent fingerprint or response that is different from that of the rare earth dopant.

The item may be validated by irradiating the item and detecting emissions at the pre-selected wavelength.

The item may be a fluid. Examples of fluids particularly suitable for use with the invention include fuel, paint, ink and such like.

Preferably, the item is a laminar media item. The laminar media item may be in the form of a web, or in sheet form. Examples of sheet form laminar media items include banknotes and financial instruments such as checks.

Preferably, the item includes a plurality of security markers, each marker emitting at a different pre-selected wavelength. Alternatively, a marker may include a plurality of rare earth dopants.

In a preferred embodiment, the markers have different concentrations of dopant, so that the intensities of the pre-selected wavelength emissions are different.

By virtue of this feature, the relative emission intensity of different pre-selected wavelengths can be used as a security feature. For example, one pre-selected wavelength intensity may be 100%, another pre-selected wavelength intensity 50%, a third pre-selected intensity 25%, and a fourth pre-selected intensity 50%. More or less than four wavelengths can be used. This provides a large variety of security profiles, where each profile comprises a ratio of intensities of a plurality of wavelengths. This also makes counterfeiting even more difficult, as the quantities of each dopant must be accurately replicated, in addition to the carrier energy difference.

In one embodiment, the emission from each marker decays over a different time period. By virtue of this feature, the time over which an emission occurs for a particular wavelength can be used as part of a security profile.

According to a third aspect of the invention there is provided a system for validating an item having an optically detectable security feature emitting light at one of a plurality of pre-selected wavelengths, where the security feature has a carrier incorporating a rare earth dopant, the system comprising: means for illuminating the security feature with one or more wavelengths for producing emissions from the rare earth dopant; means for detecting emission from the security feature at a pre-selected wavelength; means for filtering and comparing the detected emission with a security profile for the item; and means for indicating a successful validation in the event of the emission matching the security profile.

Preferably, the means for illuminating the item comprises a pulsed light emitting diode and an illumination filter for ensuring that only a narrow band of wavelengths illuminate the item.

Preferably, the means for detecting emission comprise a detection filter to filter out all wavelengths except the pre-selected wavelength, and a photodiode to detect the intensity of light passing through the detection filter.

In a preferred embodiment, the illumination means comprises an array of LEDs, each LED having a different illumination filter, so that the item to be validated is illuminated with multiple wavelengths. In such an embodiment, the detection means comprises an array of photodiodes, each photodiode having a different detection filter, so that the emission at each pre-selected wavelength can be determined.

According to a fourth aspect of the invention there is provided a method of validating an item having an optically detectable security feature emitting light at one of a plurality of pre-selected wavelengths, the method comprising the steps of: illuminating the security feature with one or more wavelengths for producing emissions from the rare earth dopant; detecting emission from the security feature at a pre-selected wavelength; filtering and comparing the detected emission with a security profile for the item; and indicating a successful validation in the event of the emission matching the security profile.

According to a fifth aspect of the invention, there is provided an optically detectable security marker for emitting light at a pre-selected wavelength, the marker comprising: a rare earth dopant incorporated within a carrier material, the dopant and the carrier material being such as to cause emission of visible light in response to optical stimulation by visible light of a pre-determined wavelength.

Preferably, the interaction of the carrier and the dopant is such as to provide a fluorescent fingerprint or response that is different from that of the rare earth dopant.

According to a sixth aspect of the invention, there is provided a security item that includes an optically detectable security marker for emitting light at a pre-selected wavelength, the marker comprising: a rare earth dopant incorporated within a carrier material, the dopant and the carrier material being such as to cause emission of visible light in response to optical excitation by visible light. Preferably, the security item is a fluid, for example fuel, paint, ink and such like. Alternatively the security item may be a laminar media item, for example banknotes and financial instruments such as checks. Preferably, the item includes a plurality of security markers, each marker emitting at a different pre-selected wavelength. Preferably, the interaction of the carrier and the dopant is such as to provide a fluorescent fingerprint that is different from that of the rare earth dopant.

According to a seventh aspect of the invention, there is provided a security marker comprising a borosilicate based glass, preferably including $SiO_2$; $Na_2O$; $CaO$; $MgO$; $Al_2O_3$ 0.29; $FeO$ and/or $Fe_2O_3$; $K_2O$, and $B_2O_3$, and a rare earth dopant, preferably a lanthanide. Preferably the glass has a composition of: $SiO_2$ 51.79 wt %; $Na_2O$ 9.79 wt %; $CaO$ 7.00 wt %; $MgO$ 2.36 wt %; $Al_2O_3$ 0.29 wt %; $FeO$, $Fe_2O_3$ 0.14 wt %; $K_2O$ 0.07 wt %, and $B_2O_3$ 28.56 wt %, not precluding the use of other glass mixes. The glass and the rare earth ion may be formed into a micro-bead.

BRIEF DESCRIPTION OF THE DRAWINGS

A security marker in which the invention is embodied will now be described by way of example only and with reference to the accompanying drawings, of which:

FIG. 1 is a block diagram of a detector arrangement;

FIG. 2 is a table showing various excitation wavelengths and corresponding emission wavelengths for a Europium dopant in a borosilicate based glass, and FIG. 3 is a table similar to that of FIG. 2 for Europium, but in solution.

DETAILED DESCRIPTION

The marker comprises a carrier, such as glass or plastic including one or more types of rare earth ion. The interaction of the glass or plastic and the dopant is such that the spectral response of the marker is different from that of the rare earth dopant or the carrier per se. In particular, the interaction between the carrier and the dopant is such that the intrinsic energy levels of the dopant change when it is incorporated into the carrier. For example, when the dopant is incorporated into a glass, new bonds are formed in the doped glass, thus altering the electron arrangement and hence the energy levels of absorption and fluorescent emission. Altering the rare earth dopant and/or dopant chelate and/or the composition of the carrier changes these energy levels and hence the observed fluorescent fingerprint. The preferred dopant is any of the lanthanides except Lanthanum. Preferably the rare earth doped glass is formed into micro-beads that can be included in, for example, a fluid such as ink.

Several methods for doping standard glass compositions with the selected fluorescent rare earth ions can be employed. In one method, test samples of doped glass are prepared by the incorporation of the rare earth ions into the batch composition using the appropriate metal salt. The glass is prepared by heating the batch in a platinum crucible to above the melting point of the mixture. In another method, existing standard glass samples are powdered and mixed with solutions of the fluorescent ions. The glass is lifted out of the solvent, washed and then oven dried.

An example of a glass that could be used as the carrier material for the rare earth dopants is a borosilicate based glass. In particular, a glass that could be used is as follows: $SiO_2$ 51.79 wt %; $Na_2O$ 9.79 wt %; CaO 7.00 wt %; MgO 2.36 wt %; $Al_2O_3$ 0.29 wt %; FeO, $Fe_2O_3$ 0.14 wt %; $K_2O$ 0.07 wt %, and $B_2O_3$ 28.56 wt %. This can be made by ball milling soda lime beads (100 μm) for 5 minutes to create a powder to help melting and mixing. Then 5 g of the crushed soda lime beads, 2 g of the $B_2O_3$ and 3 mol % of the rare earth dopant, for example Europium, Dysprosium and Terbium but also others, are ball milled together for, for example, 3 minutes. The resulting powder is then put in a furnace and heated up to 550C. It is left in the furnace at this temperature for about 30 minutes, to ensure that the boric oxide is completely melted. Then the temperature is increased to 1100C for 1 hour to produce a homogeneous melt. The temperature is increased again to 1250C and the molten glass is poured into a brass mould, which is at room temperature, which quenches the glass to form a transparent, bubble free borosilicate glass, doped with a rare earth ion.

The peak emission wavelength for fluorescent emission in the marker depends on the energy levels of the final rare earth doped glass. Altering the weight percentage of the network modifier oxides within the glass matrix will change these levels and hence change the observed peak fingerprint. Hence, to observe the correct wavelength fingerprint, the glass composition has to be known. Likewise, where two or more rare earth dopants are used, varying the ratios, by mole percentage, of these changes the fluorescence intensity in the detected signal. Peak intensities can be used as part of the encoding scheme and so by varying the dopant levels, there is provided an opportunity to provide even more encoding options.

FIG. 1 shows an arrangement for detecting information encoded in accordance with the present invention. This includes a sensor and a platform for supporting an item under test. The sensor has a housing in which are provided an emitter, for example a light emitting diode (LED), at the output of which is provided a narrow band filter. The narrow band filter allows only a very narrow, pre-determined range of wavelengths to be passed. As an example, the filter could be selected to allow a narrow band pass centered on a wavelength of 465 nm to pass through it and toward the sample platform. Adjacent to the emitter is a detector, such as a photodiode. At its input is a narrow band filter that allows only a very narrow, pre-determined range of wavelengths to pass through it. As an example, the filter could be selected to allow light centered on a wavelength of 615 nm to reach the detector.

In use of this arrangement, light is emitted from the emitter and passed through the first narrow band filter and onto a security item that carries or includes the marker. This light is absorbed by the rare earth dopant, which if it matches the energy levels of the dopant and carrier used causes it to fluoresce. Light emitted from the item is transmitted towards the second filter, and from there, to the detector. Also the emission from each marker decays over a different time period. By virtue of this feature, the time over which an emission occurs for a particular wavelength can be used as part of a security profile. For authentic documents, the light received at the detector should have one or more characteristic features that can be identified. In the event that the detected response has the expected features, the item is identified as being bona fide. In the event that the response is not as expected or is not within an acceptable range of the expected response, the item is identified as being a potential counterfeit.

The spectral emissions of various marker samples have been investigated. As an example, FIG. 2 shows a table of the emission wavelengths and intensities for various different excitation wavelengths for a marker comprising of 3 mol % $EuCl_3$ when included in the borosilicate glass described above. By way of comparison, FIG. 3 shows the corresponding results for the $EuCl_3:6H_2O$ dopant, but when in solution. From these Figures, it can be seen that in glass the most significant excitation is at 395 nm, which emits at 615 nm and 590.5 nm. The corresponding results for the $EuCl_3:6H_2O$ in solution shows that the emission wavelengths here are 592.5 nm, 618.5 nm, 556.5 nm, 536 nm and 526 nm. Hence the spectral response of the marker at 395 nm is significantly different from that of the $EuCl_3:6H_2O$ in solution. Also in glass, for excitation at a wavelength of 415 nm, there is an output of 615 nm and 590.5 nm. In contrast for the $EuCl_3:6H_2O$ in solution there is effectively no fluorescence at this wavelength. Again, this demonstrates that there is significant and measurable difference caused by the incorporation of the $EuCl_3:6H_2O$ in the borosilicate carrier.

Because rare earth ions have well defined and relatively narrow, non-overlapping spectral bands, this means for many applications it is possible to detect the security marker using a single discrete pre-determined excitation wavelength and likewise a single discrete pre-determined detection wavelength. For example, for the $EuCl_3$ doped borosilicate glass described above, the emitter filter could be selected to be 465 nm, and the detector filter could be 615 nm. Alternatively, a plurality of stimulating wavelengths could be used. To do this, a number of different suitable emitter filters would be selected, and a plurality of corresponding filters. These would be included in the arrangement of FIG. 1 to allow the simultaneous measurement of optical response at various different wavelengths.

A further advantage of the discrete nature of spectral response of rare earth ions is that a number of species can be combined into the one product for improved security for example 3 mole % Eu+3 mole % Th, not precluding other rare earths at different percentages and more than two. Because the response of the various different dopants is relatively discrete, detection of these is simplified. The narrow emission bands also facilitate the spectral selection of the molecules, making the detection system simpler than those required for systems containing multiple dyes. A further advantage is that many rare earth ions require excitation at wavelengths conducive to existing laser diode technologies. This makes online excitation not only possible but compact, robust and long lived. Furthermore, incorporating the rare earth dopants into a suitable carrier, and in particular the glass beads described herein, means that the security marker in which the invention is embodied is extremely stable under adverse chemical, environmental and physical abrasion conditions, thereby ensuring that it has a long lifetime compared to conventional dyes.

A skilled person will appreciate that variations of the disclosed arrangements are possible without departing from the invention. For example, whilst only a few rare earth ions have been specifically described, it will be appreciated that there is a wide range of fluorescent rare earth ions that could be used. The number of permutations available is therefore greatly enhanced. In addition, whilst some rare earth ions emit in the UV and IR ranges, it is preferred that both the excitation radiation and the emitted radiation are within the visible range, that is within a wavelength range that is visible to the unaided human eye. Accordingly, the above description of a specific embodiment is made by way of example only and not for the purposes of limitation. It will be clear to the skilled person that minor modifications may be made without significant changes to the operation described.

What is claimed is:

1. An optically detectable security feature comprising:
   at least one rare earth dopant having an intrinsic set of energy levels;
   a glass or plastic particle incorporating the at least one rare earth dopant, where interaction between the particle and the at least one rare earth dopant is such that the intrinsic set of energy levels is modified to provide a new electronic energy level profile that allows transitions different to those allowed by either the rare earth dopant by itself or the undoped glass or plastic particle; and
   a security profile associated with the new electronic energy level profile, where the security profile comprises (i) a ratio of emission intensities at a plurality of pre-determined wavelengths of the doped glass or plastic particle, and (ii) an emission lifetime at one of the plurality of pre-determined wavelengths which is different to an emission lifetime at another of the plurality of pre-determined wavelengths.

2. The optically detectable security feature of claim 1 wherein the glass or plastic particle is a borosilicate glass particle.

3. The optically detectable security feature of claim 1 wherein the glass or plastic particle is a microbead.

4. The optically detectable security feature of claim 1, wherein the security profile is responsive to excitation at a pre-determined wavelength between 395 nm and 535 nm.

5. A security media comprising:
   amedia;
   an optically detectable security feature incorporated within the media, the feature comprising:
   at least one rare earth dopant having an intrinsic set of energy levels;
   a glass or plastic particle incorporating the at least one rare earth dopant, where interaction between the particle and the at least one rare earth dopant is such that the intrinsic set of energy levels is modified to provide a new electronic energy level profile that allows transitions different to those allowed by either the rare earth dopant by itself or the undoped glass or plastic particle; and
   a security profile associated with the new electronic energy level profile, where the security profile comprises (i) a ratio of emission intensities at a plurality of pre-determined wavelengths of the doped glass or plastic particle, and (ii) an emission lifetime at one of the plurality of pre-determined wavelengths which is different to an emission lifetime at another of the plurality of pre-determined wavelengths.

6. The security media of claim 5 wherein the media comprises a fluid.

7. The security media of claim 5 wherein the media comprises a document.

8. A method of preparing an optically detectable security feature of increased difficulty for unauthorized reproduction for purposes of counterfeiting, the method comprising:
   selecting a glass or plastic carrier and a plurality of rare earth dopants such that when the rare earth dopants are incorporated into the glass or plastic carrier, interaction between the carrier and the at least one rare earth dopant is such that a security profile is provided based on a plurality of pre-determined emission wavelengths that differ from emission wavelengths of either the rare earth dopants or the glass or plastic carrier;
   creating particles comprising the glass or plastic carrier incorporating the plurality of rare earth dopants, such that each particle exhibits a security profile comprising (i) a ratio of emission intensities at a plurality of pre-determined wavelengths of the doped glass or plastic particle, and (ii) an emission lifetime at one of the plurality of pre-determined wavelengths which is different to an emission lifetime at another of the plurality of pre-determined wavelengths.

9. A method of validating an item having an optically detectable security feature comprising at least one rare earth dopant having an intrinsic set of energy levels, where each of the at least one rare earth dopant is incorporated in a glass or plastic particle and interaction between the particle and the at least one rare earth dopant is such that the intrinsic set of energy levels is modified to provide a new electronic energy level profile that allows transitions different to those allowed by either the rare earth dopant by itself or the undoped glass or plastic particle, the method comprising:
   illuminating the security feature at an excitation wavelength to produce emissions from the at least one rare earth dopant;
   detecting emissions from the security feature at a plurality of pre-determined wavelengths allowed by the new electronic energy level profile;
   ascertaining a ratio of intensities of emissions at the plurality of pre-determined wavelengths and emission lifetimes at each of the plurality of pre-determined wavelengths;
   comparing the ascertained ratio of intensities of emissions and emission lifetimes at the plurality of pre-determined wavelengths with a security profile comprising (i) relative emission intensities at the plurality of pre-determined wavelengths, and (ii) emission lifetimes at each of the plurality of pre-determined wavelengths; and
   indicating a successful validation in the event of a match.

10. An optically detectable security feature comprising:
    at least one rare earth dopant having an intrinsic set of energy levels;
    a glass or plastic particle, other than an optically stimulable glass, incorporating the at least one rare earth dopant, where interaction between the particle and the at least one rare earth dopant is such that the intrinsic set of energy levels is modified to provide a new electronic energy level profile that allows transitions different to those allowed by either the rare earth dopant by itself or the undoped glass or plastic, particle; and
    a security profile associated with the new electronic energy level profile, where the security profile comprises (i) a ratio of emission intensities at a plurality of pre-determined wavelengths of the doped glass or plastic particle, and (ii) an emission. lifetime at one of the plurality of pre-determined wavelengths which is different to an emission lifetime at another of the plurality of pre-determined wavelengths where the emission intensities and the emission lifetimes are measured in the absence of excitation.

11. An optically detectable security feature comprising:
    at least one rare earth dopant having an intrinsic set of energy levels;

a silicon dioxide based particle incorporating the at least one rare earth dopant, where interaction between the particle and the at least one rare earth dopant is such that the intrinsic set of energy levels is modified to provide a new electronic energy level profile that allows transitions different to those allowed by either the rare earth dopant by itself or the undoped silicon dioxide based particle; and a security profile associated with the new electronic energy level profile, where the security profile comprises (i) a ratio of emission intensities at a plurality of pre-determined wavelengths of the doped silicon dioxide based particle, and (ii) an emission lifetime at one of the plurality of pre-determined wavelengths which is different to an emission lifetime at another of the plurality of pre-determined wavelengths.

* * * * *